US006977945B1

(12) United States Patent
Noda et al.

(10) Patent No.: US 6,977,945 B1
(45) Date of Patent: Dec. 20, 2005

(54) NETWORK INTERFACE APPARATUS FOR CONTROLLING THE SIZE, COUPLING OR TRANSFER RATE OF PACKETS ON THE BASIS OF AN IP NETWORK DELAY AND A METHOD THEREFOR

(75) Inventors: Takashi Noda, Tokyo (JP); Katsutoshi Tajiri, Tokyo (JP); Rika Kamimura, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 762 days.

(21) Appl. No.: 09/663,923

(22) Filed: Sep. 18, 2000

(30) Foreign Application Priority Data

Dec. 10, 1999 (JP) ................................ 11/351713

(51) Int. Cl.[7] ................................................ H04J 3/22

(52) U.S. Cl. ...................... 370/468; 370/516; 358/404; 709/228

(58) Field of Search ......................... 358/1.1, 400, 404; 370/352, 401, 468, 516, 519; 379/88.17; 382/276; 705/80; 706/50; 709/100, 105, 709/200, 221, 226, 223, 227, 228; 713/100

(56) References Cited

U.S. PATENT DOCUMENTS

| | | | | |
|---|---|---|---|---|
| 5,296,934 | A * | 3/1994 | Ohtsuki | 358/403 |
| 6,298,057 | B1 * | 10/2001 | Guy et al. | 370/389 |
| 6,359,877 | B1 * | 3/2002 | Rathonyi et al. | 370/349 |
| 6,360,271 | B1 * | 3/2002 | Schuster et al. | 709/231 |
| 6,370,163 | B1 * | 4/2002 | Shaffer et al. | 370/519 |
| 6,646,986 | B1 * | 11/2003 | Beshai | 370/230.1 |
| 6,646,987 | B1 * | 11/2003 | Qaddoura | 370/231 |
| 6,674,550 | B1 * | 1/2004 | Ezumi et al. | 358/442 |

FOREIGN PATENT DOCUMENTS

| | | |
|---|---|---|
| JP | 58-161038 | 9/1983 |
| JP | 4-96454 | 3/1992 |
| JP | 4-307831 | 10/1992 |
| JP | 5-227223 | 9/1993 |
| JP | 7-79250 | 3/1995 |
| JP | 7-303117 | 11/1995 |
| JP | 8-331164 | 12/1996 |
| JP | 9-331348 | 12/1997 |
| JP | 10-178494 | 6/1998 |
| JP | 10-334023 | 12/1998 |

* cited by examiner

*Primary Examiner*—Wellington Chin
*Assistant Examiner*—John Shew
(74) *Attorney, Agent, or Firm*—Venable LLP; Michael A. Sartori

(57) ABSTRACT

During G3FAX communication with an IP network 30, a FAX adapter 10 controls a packet size data storage **100*d* with the use of a control signal 14, generated by a packet size controller 10*e*, to adjust the packet size of FAX data sent from a G3FAX 20 according to delay information 12*f* from the IP network 30. When sending data to the IP network 30, the adapter 10 allows the size of a packet to be adjusted in response to the delay information 12*f* sent from the IP network 30**, thus resolving a discrepancy in transfer speed.

17 Claims, 5 Drawing Sheets

NETWORK INTERFACE APPARATUS FOR CONTROLLING THE SIZE, COUPLING OR TRANSFER RATE OF PACKETS ON THE BASIS OF AN IP NETWORK DELAY AND A METHOD THEREFOR

BACKGROUND OF THE INVENTION

1. Field of the Invention

The present invention relates to a network interface apparatus for use in data communication over an IP (Internet Protocol) network and a method therefor. More particularly, the present invention is advantageously applicable to a gateway apparatus connected to a computer function for performing data communication such as a real-time G3 facsimile connected to the Internet for establishing smooth communication therebetween.

2. Description of the Background Art

Several related technologies, described below, have been proposed for data communication, communication control, and connection selection for use in systems with different transfer speeds or transmission rates.

First, in Japanese Patent Laid-Open Publication No. 96454/1992, there is disclosed a communication control system for adjusting transfer speeds for data communication between systems with different transfer speeds. This publication describes a system in which transfer speed conversion means is provided between two systems for controlling data transfer processing via control means. This system uses only one dual-port RAM, instead of a buffer memory such as a FIFO memory, to reduce the system cost.

Second, in Japanese Patent Laid-Open Publication No. 331164/1996, there is disclosed a communication control system for use in connecting to a plurality of types of LANs. This system has a buffer controller that sets up a buffer size at the start of data transfer processing. This buffer size defines the maximum data amount processible by one transmission/reception sequence according to the environment condition to increase data transfer efficiency.

Third, in Japanese Patent Laid-Open Publication No. 331348/1997, there is disclosed a network connection apparatus that selects destinations according to the protocol type. This apparatus has a pre-set table, via which a line best suited for the protocol of a received packet is selected for transmission, to increase user operability and reduce line costs.

In addition, in Japanese Patent Laid-Open Publication No. 178494/1998, there is disclosed a communication terminal, a communication system, and a communication control method. For example, when the continuous communication time is limited to a predetermined period of time as in the G3 protocol, the maximum data amount that can be sent is set by setting means based on the limitation time and the amount of transmission data. Control means of the system controls transmission based on this setting to send data smoothly.

Finally, in Japanese Patent Laid-Open Publication No. 334023/1998, there is disclosed electronic equipment that can be applied to network communication according to the TCP/IP (Transmission Control Protocol/Internet Protocol) protocol. When the equipment receives print output data from an upline network, it notifies a terminal or some terminals on a downline network, to which the equipment is connected, that the data has been received. And, upon receiving a data request from the terminal in response to this notification, the equipment sends the received data to the terminal. This method allows the user of a terminal on the downline network to recognize that the data has been received on the upline network and, between the real-time G3FAX and the IP network and terminates processing abnormally.

SUMMARY OF THE INVENTION

The present invention seeks to solve the problems associated with the prior art described above. It is therefore an object of the present invention to provide a network interface apparatus and a method therefor that can, in consideration of transmission to or from the IP network, avoid an abnormal termination of a real-time G3FAX transmission.

To solve the above problems, a network interface apparatus for interfacing a communication terminal with an IP network comprises an adjuster operative in response to information supplied from the IP network and/or on a difference in an amount of data sent between the IP network and the communication terminal for adjusting a packet size of data, a transfer speed of supplied data according to the information from the IP network, or the data amount to be sent at a time.

It is preferable that the adjuster comprises a size controller controlling the packet size according to the information from the IP network when the supplied data is divided into units each having a predetermined amount.

It is preferable that the adjuster comprises a transfer speed controller for controlling the data transfer speed at which the supplied data is transferred to or from the communication terminal according to the information obtained from the IP network.

It is advantageous that the adjuster comprises a memory in which an amount of data corresponding to the difference in the amount of data sent between the IP network and the therefore, utilizes the functions of the TCP/IP network.

Today, real-time Group 3 facsimile (hereinafter called a real-time G3FAX) communication is performed based on the ITU-T (International Telecommunication Union-Telecommunication Standardization Sector) Recommendations T.30 and T.38. For reliable data transmission, one of two protocols is used: Transmission Control Protocol (hereinafter called TCP) for an Internet Protocol (herein after called IP) network and User Data Protocol (hereinafter called UDP) for an IP network.

The Recommendation T.30 proposes a real-time G3FAX protocol for providing good quality image transmission. To make adjustment of processing between a gateway and a real-time G3 terminal and to reduce a transfer delay, the Recommendation T.38 specifies how to make adjustment of image transmission within the specifications of the Recommendation T.30 and according to the (TCP/UDP) service environment.

Facsimile control data and image data in accordance of the Recommendation T.30 are transmitted in IFP (Internet Facsimile Protocol) packets, corresponding to the payload of the data area and each with an octet stream structure, using one of the protocols described above.

In an actual operation, a real-time G3FAX defines an operation setting according to the protocol, performs negotiations, and determines the transfer speed of data such as image data. However, because the data transfer speed is determined with no consideration for the IP network conditions, the determined real-time G3FAX transfer speed is not attained during TCP communication if the IP network transmission delay is large. When this condition occurs, the real-time G3FAX, for example, judges that an error occurred during communication communication terminal is coupled and stored; and an input/output control for controlling an input/output of the memory according to whether or not the amount of data produced by a packetizer circuit and the amount of data stored in the memory are equal to or larger than a predetermined amount.

The interface apparatus may advantageously be included in a record transmission apparatus for capturing an image of a document to from data representative of the image.

The network interface apparatus according to the present invention determines the delay in transmission between the IP network and the apparatus as delay information at an interface circuit. The control circuit operates in response to the delay information for controlling a packetizer circuit to adjust the size of a packet on the basis of the delay information. The control circuit controls a transmitter to adjust the transfer rate of transferring the data on the basis of the delay information. The packetizer circuit sends the packetized data to a packet coupler. The packet coupler stores and couples the supplied packets with each other. The packet coupler inhibits the packetizer circuit from developing the packet, when the packet coupler stores more packets than a first predetermined amount. The network interface apparatus satisfactorily adjusts the negotiation between the IP network and the communication terminal, such as the FAX terminal, for performing data communication in real time.

To solve the above problems, in first, a method of interfacing a communication terminal with an IP network according to the present invention comprises the steps of, receiving data to be transferred from the communication terminal; determining a delay in transmission over the IP network; packetizing the data to be transferred into a packet; adjusting the size of the packet on the basis of the delay determined; and transferring the packet having the size adjusted to the IP network.

To solve the above problems, in second, a method of interfacing a communication terminal with an IP network according to the present invention comprises the steps of, receiving data to be transferred from the communication terminal; determining a delay in transmission over the IP network; packetizing the data to be transferred into a packet; adjusting the transfer rate of transferring the data on the basis of the delay determined; and transferring the data to the IP network.

To solve the above problems, in third, a method of interfacing a communication terminal with an IP network according to the present invention comprises the steps of, receiving data to be transferred from the communication terminal; determining a delay in transmission over the IP network; packetizing the data to be transferred into a packet by a packetizer circuit; coupling two or more of the packets with by a packet coupler; transferring the packet to the IP network; and inhibiting the packetizer circuit from developing the packet when the packet coupler includes more packets than a predetermined amount.

The method of interfacing a communication terminal with an IP network according to the present invention determines a delay in transmission over the IP network, when receiving data transferred from the communication terminal. The method adjusts the size of the packet or the transfer rate of transferring the data on the basis of the delay. A packetizer circuit packetizes data to be transferred into a packet. A packet coupler stores the packets and couples two or more of the packets. The packetizer circuit is inhibited from developing the packet when the packet coupler includes more packets than a predetermined amount. Thus, the method adjusts the packetizing of data to be transferred to the IP network. In these way, the method adjusts the delay encountered during communication between the IP network and the communication terminals to prevent an abnormal termination.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Embodiments of a communication connection apparatus according to the present invention will be described in detail with reference to the accompanying drawings.

Briefly, in the illustrative embodiments, the communication connection apparatus according to the present invention comprises an adjuster which adjusts a data transmission and reception delay involved in the transfer of data between the IP network and a communication apparatus. The adjuster does so by changing the packet size according to the information from the IP network or according to the storage amount of data sent from a communication apparatus or by changing the transfer speed according to the information (for example, delay information) sent from the IP network. In this way, the communication connection apparatus according to the present invention adjusts the negotiation between a communication apparatus included the IP network and so on to transfer data in real time.

The communication connection apparatus applied to a FAX adapter 10 will be described. The components not directly related to the present invention are not included in the figures nor the description. A signal is referred to by the reference number of the connection line over which the signal is sent.

Figure 1:
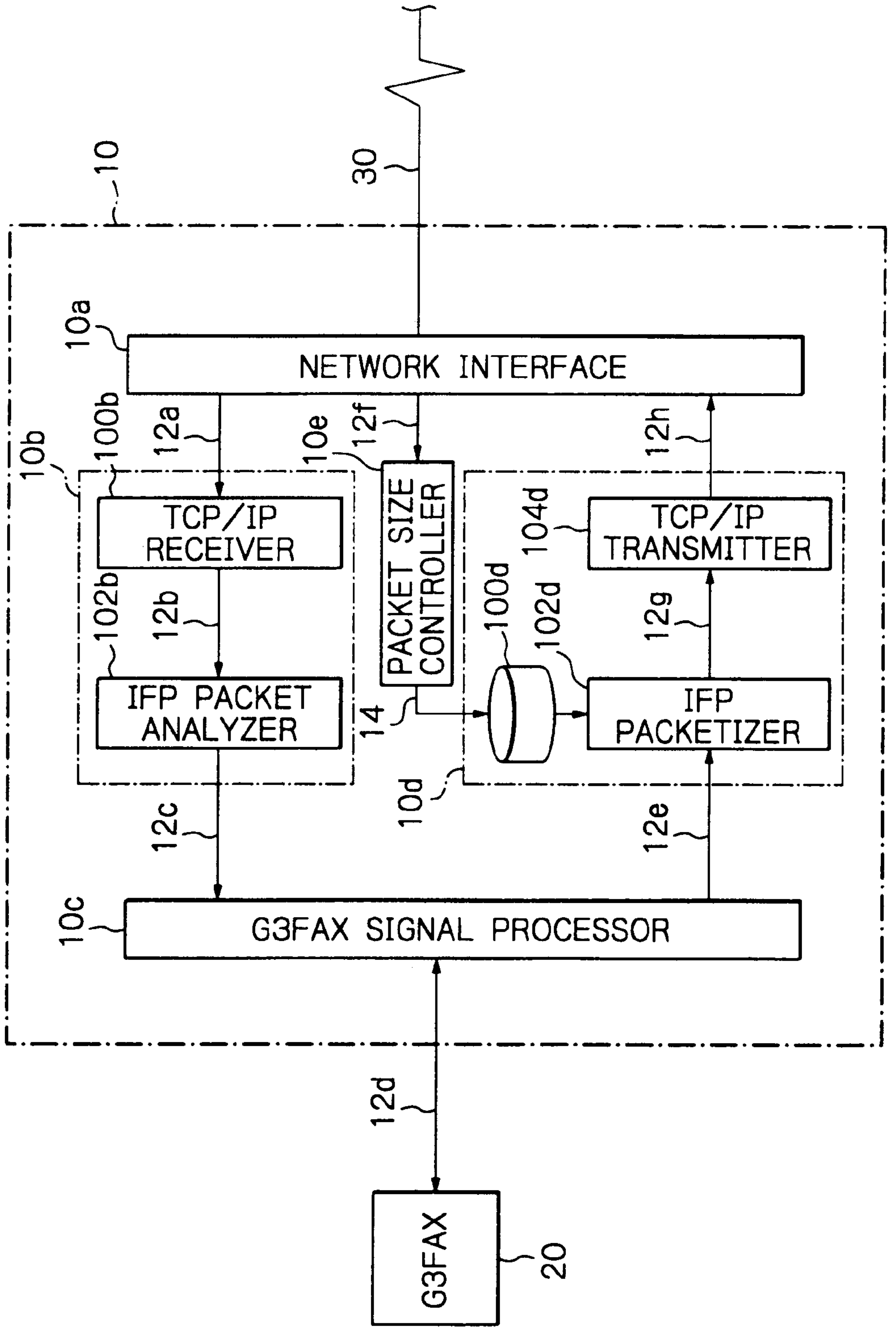
FIG. 1 is a block diagram schematically showing an embodiment of a FAX adapter to which a communication connection apparatus according to the present invention is applied.

Referring to FIG. 1, the FAX adapter 10 is provided between a Group 3 facsimile (hereinafter called G3FAX) 20 and an IP (Internet Protocol) network 30 over which data is transmitted according to the IP. The destination terminal (for example, a computer) at the other end of communication over the IP network 30 is omitted in the figure. The FAX adapter 10 corresponds to a gateway. The G3FAX 20 is a sort of communication terminal adapted to capture an image of an original document to form data representative of the image, which will in turn be developed on its output port **12*d***.

The FAX adapter 10 basically comprises a network interface **10*a*, a receiver 10*b*, a G3FAX signal processor 10*c*, a transmitter 10***d*, and a packet size controller 10*e*. Basically, the network interface 10*a* interfaces the physical/electrical characteristics of signals sent via other nodes so that they are interconnected successfully and performs data link and protocol processing. The network interface 10*a* sends a TCP packet 12*a* received from the IP network 30 to the receiver 10*b*.

Though not shown in the figure, the network interface 10*a* of this embodiment includes a ping (one of utility programs) transmission section and a delay time measuring section, both not shown. Ping is a command used to confirm that a computer has established a correct and complete connection with another computer at the IP level. In practice, ping uses the Internet Control Message Protocol (ICMP). When ping is executed, an echo request is sent to the terminal equipment at the other end of the connection to check its status. Upon receiving this request, the terminal equipment at the other end sends an echo back. The time the echo request is sent or received is sent from the timer of the FAX adapter 10 to the delay time measuring section.

The delay time measuring section subtracts the transmission time from the reception time to calculate the difference. This time difference is a communication response time. The network interface 10*a* sends this information 12*f* to the packet size controller 10*e*, which will be described later, as the delay information (i.e., time difference). When no response is received for a predetermined period of time after ping is sent, the ping transmission section sends another ping.

The receiver 10*b* comprises a TCP/IP receiver 100*b* and an IFP packet analyzer 102*b*. Either the IFP/TCP/IP packet hierarchy model indicating the high-level IFP/TCP/IP packet structure or the flat model is applied to the TCP/IP receiver 10*b*. The TCP/IP receiver 100*b* obtains an IFP packet area according to these models. More specifically, when the model is the hierarchy model, the TCP payload in the IP payload corresponds to an IP packet. When the model is the flat model, an IFP packet is directly below the TCP header. The obtained IFP packet 12*b* is sent to the IFP packet analyzer 102*b*. The IFP packet 12*b* includes one or more HDLC (High level Data Link Control) frames or phase C data "pages".

The IFP packet analyzer 102*b* analyzes the type included in the received IFP packet 12*b* and the setting of the type field and depacketizes the packet 12*b* into a series of data. The analysis of the IFP packet contents gives an instruction indicating how to communicate with the G3FAX 20. This instruction is represented by an IFP data element which includes the ITU-T Recommendation T.30 indicator value, T.30 data type, data from the connected PSTN (Public Switched Telephone Network), and other data format indicators. The IFP data element is composed of one or more fields, each field being composed of the field part and the field-data part. An IFP packet is analyzed according to this definition. The analysis result is sent to the G3FAX signal processor 10*c* as FAX data 12*c*.

The G3FAX signal processor 10*c* converts the FAX data 12*c* to G3FAX 20 signals based on the analysis result. More specifically, the G3FAX signal processor 10*c* generates the G3FAX-based modulated FAX signal according to the instruction indicating how to modulate FAX data 12*c*. The G3FAX signal processor 10*c* outputs a generated FAX signal 12*d* to the G3FAX 20. The G3FAX signal processor 10*c* also generates transmission data that will be described later.

The G3FAX 20 processes the FAX signal 12*d* in the same manner (demodulation) as the FAX signal received on a PSTN line and outputs it, for example, on paper. In this manner, the FAX signal is received and displayed.

Conversely, when data read from the G3FAX 20 is sent, the G3FAX 20 modulates the data based on the G3FAX standard. The modulated G3FAX signal is sent to the G3FAX signal processor 10*c* of the FAX adapter 10. The G3FAX signal processor 10*c* converts the FAX signal 12*d* received from the G3FAX 20 to digital data, that is, to FAX data 12*e*. This conversion is performed with no consideration for the conditions of the IP network 30. The FAX data 12*e* is sent to the transmitter 10*d*.

The transmitter 10*d* comprises a packet size data storage 10*d*, an IFP packetizer 102*d*, and a TCP/IP transmitter 104*d*. The packet size data storage 100*d* stores therein condition data indicating how the transmitter 10*d* sets up FAX data based on the T.38 standard. The FAX data is sent to the IFP packetizer 102*d* under the control of the system controller which is not shown in the figure. At this time, the IFP packetizer 102*d* packetizes the FAX data 12*e* on the basis of the IFP protocol satisfying the specified condition. The FAX data 12*e* is packetized so that it may be stored in the payload. The IFP packetizer 102*d* sends the IFP packet 12*g* to the TCP/IP transmitter 104*d*.

The TCP/IP transmitter 104*d* incorporates the IP header and the TCP header into the IFP packet 12*g* according to the model and outputs the TCP packet 12*h* to the network interface 10*a*. The network interface 10*a* interfaces the physical/electrical characteristics of the TCP packet 12*h* and then outputs the packet 12*h* to the IP network 30.

However, depending upon the conditions of the IP network 30, the negotiation with the other end of the connection, such as a communication terminal or a G3FAX, could otherwise not be performed properly as described above. To solve this problem, the packet size controller 10*e* is provided in this embodiment. The packet size controller 10*e* controls the packet size data storage 100*d* (packet size adjustment process of data) based on the information (delay information) 12*f* sent from the network interface 10*a*.

Several types of size data are pre-stored in the packet size data storage 10*d*. In response to control data 14 from the packet size controller 10*e*, the packet size data storage 100*d* outputs an instruction to the IFP packetizer 102*d*. The IFP packetizer 102*d* packetizes the data with the size according to the instruction and sends the generated packet to the other end equipment of the connection via the TCP/IP transmitter 104*d*, network interface 10*a*, and the IP network 30.

In other words, the TCP packet size may be changed in real time considering the conditions of the IP network 30. For example, when the delay is large, the packet size is increased. This increases TCP transfer efficiency and satisfies the transfer speed or transmission rate requirements determined by the G3FAX protocol. That is, the negotiation is performed reliably and therefore the abnormal termination of real time G3FAX communication may be avoided.

Figure 2:
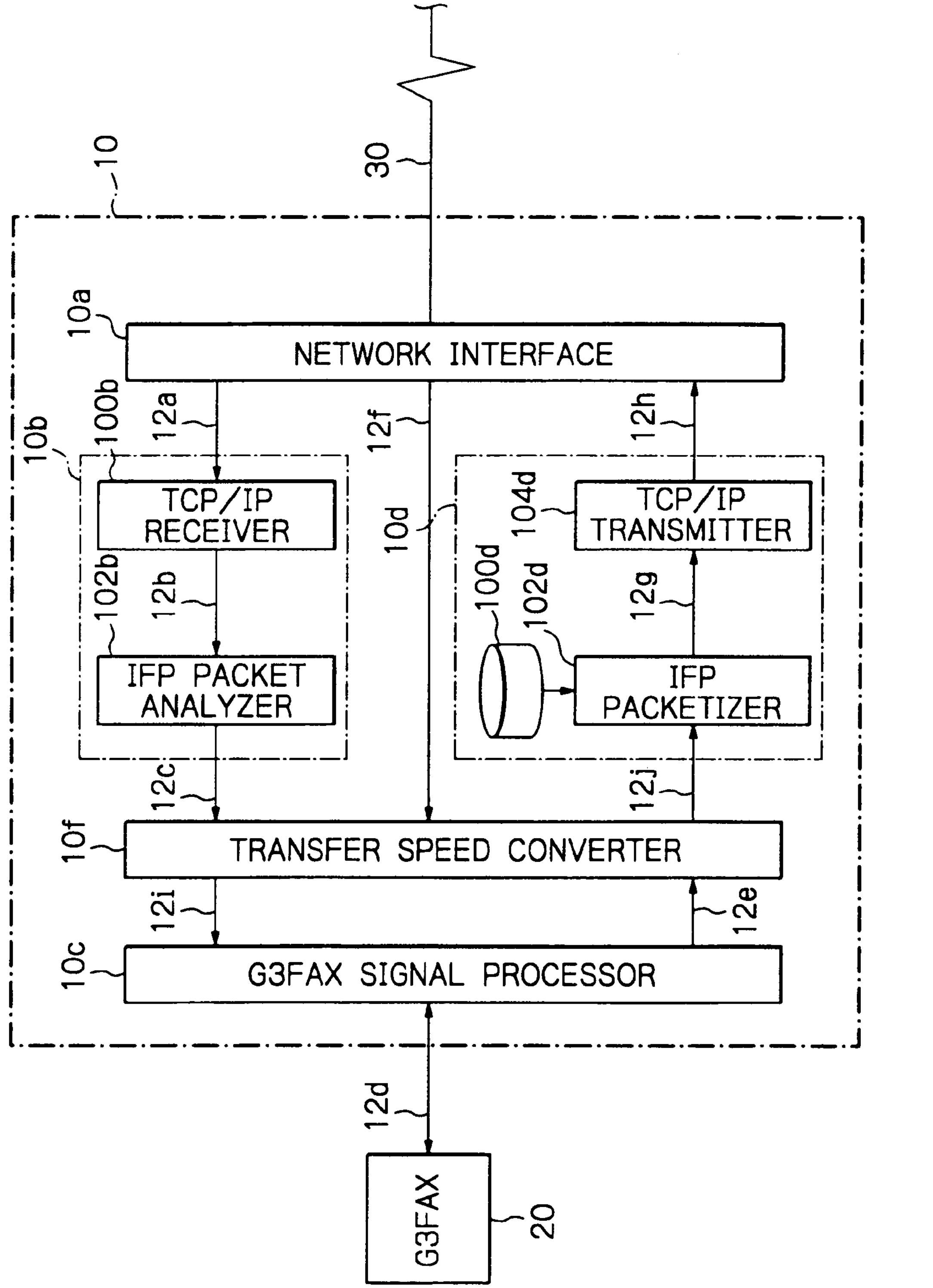
FIG. 2 is a schematic block diagram, similar to FIG. 1, showing an alternative embodiment of the invention.

Next, an alternative embodiment of the FAX adapter 10 will be described with reference to FIG. 2. In this embodiment, the network interface 10*a*, receiver 10*b*, G3FAX signal processor 10*c*, and transmitter 10*d* are the same as those in the above embodiment shown in and described with reference to FIG. 1. The description of the same components are not repeated. In the alternative embodiment, the delay information sent to the packet size controller 10*e* in the above embodiment is sent to a transfer speed converter 10*f*. As shown in FIG. 2, the transfer speed converter 10*f* is provided between the G3FAX signal processor 10*c* and on one hand the receiver 10*b* and on the other hand the transmitter 10*d*.

This arrangement allows the transfer speed converter 10*f* to receive the FAX data 12*c* from the receiver 10*b* when receiving and to receive the FAX data 12*e* from the G3FAX signal processor 10*c* when transmitting. The transfer speed converter 10*f* modifies the facsimile control field data of the FAX data 12*c* and 12*e*, sent based on the T.30 standard, according to the delay information 12*f*.

More specifically, the delay information 12*f*, which indicates the difference between the communication speed of the IP network 30 and the transfer speed, is sent to the transfer speed converter 10*f*. Upon receiving this data, the transfer speed converter 10*f* changes the transfer speed data on the FAX data 12*c* and 12*e* according to the received delay information 12*f* so that the transfer speed does not exceed the communication speed of the IP network 30. Note that, because data is received at a speed determined by the communication speed of the IP network 30 during data reception, the data speed need not be changed at reception. Therefore, the transfer speed converter 10*f* may be designed to output received data without changing the speed.

On the other hand, the digital identification signal (DIS/DTC, hereinafter called DIS) is changed during data transmission. The DIS signal represents the standard ITU-T capability of the called unit. The digital command signal (hereinafter called DCS) is also available as a reference. The DCS signal is a digital setting command that responds to the standardized function identified by the DIS signal.

The DIS signal and the DCS signal, both of which correspond to bits 11–14 of the facsimile data control field, represent the data signal speed. More specifically, the DIS signal uses these bits to represent the standard used. When the bits are "0000", the V.27ter fallback mode is selected; when the bits are "0100", V.27ter is selected; when the bits are "1000", V.29 is selected; when the bits are "1100", V.27ter or V.29 is selected according to the delay information 12*f*; when the bits are "1101", V.27ter, V.29, or V.17 is selected according to the delay information 12*f*. The transfer speed is changed based on the delay information 12*f* so that the preset communication speed of the IP network 30 are satisfied when transmitting.

The DCS signal uses these bits to represent the data signal speed and the standard used. When the bits are "0000", 2400 bits/s of V.27ter is used; when the bits are "0100", 4800 bits/s of V.27ter is used; when the bits are "1000", 9600 bits/s of V.29 is used; when the bits are "1100", 7200 bits/s of V.29 is used; when the bits are "0001", 14400 bits/s of V.17 is used; when the bits are "0101", 12000 bits/s of V.17 is used; when the bits are "1001", 96 00 bits/s of V.17 is used; when the bits are "1101", 7200 bits/s of V.17 is used. These bits indicate the setting of FAX data 12*c* that is received during reception.

The transfer speed converter 10*f* converts the transfer speed according to the conditions of the IP network 30 and the conditions of the G3FAX 20. Especially when the conditions of the IP network 30 must be considered, the converter 10*f* changes the signal bit data described above so that the requirements are satisfied, taking into consideration the delay information 12*f* representing the conditions of the network to which the terminal equipment at the other end is connected. This is done under the control of the system controller which is not shown in the figure. During reception, the transfer speed converter 10*f* does not process the received data but outputs a FAX signal 12*i* directly to the G3FAX signal processor 10*c*. During transmission, the transfer speed converter 10*f* outputs a speed-adjusted FAX signal 12*j* to the IFP packetizer 102*d*. This conversion also may successfully adjust the speed so that the transfer rate does not exceed the TCP/IP communication capability so that a communication abnormal termination is avoided.

The operation procedure of the transfer speed converter 10*f* will be described briefly. When the DIS signal of the FAX data is detected, the transfer speed converter 10*f* modifies the DIS signal bit data based on the Recommendation T.30 to maximize the FAX transmission speed within the allowable transmission speed range. In other cases, the transfer speed converter does nothing but outputs the FAX data.

Next, a further alternative embodiment of the FAX adapter 10 will be described with reference to FIG. 3. In this embodiment, the network interface 10*a*, receiver 10*b*, and G3FAX signal processor 10*c* are the same as those in the first embodiment described above. The description of the same components are not repeated. In the instant, alternative embodiment, an IFP coupler 108*d* is added to the transmitter 10*d* in the first embodiment described above. In this embodiment, when there is a difference in speed between the generation of the IFP packet 12*g* from the IFP packetizer 102*d* and an output 121 from the IFP coupler 108*d*, it is assumed that this difference may be considered as a delay caused by the conditions of the G3FAX 20 and the IP network 30, for example, by the congestion in the IP network 30. Because this difference is reflected on the amount of IFP packets stored in the packet coupling work memory, not shown, in the IFP coupler 108*d*, the memory size is designed considering this difference. This means that the packet coupling work memory may have the adjustment function used to reduce the difference considered as a delaying situation so as to maintain a connection relation with the other end equipment of the connection.

To implement this adjustment function, the IFP coupler 108*d* includes a work memory controller which is not shown in the figure. When the work memory contains more IFP packets 12*g* than a predetermined amount, the work memory controller outputs a control signal 12*k* to the IFP packetizer 102*d* to inhibit packet transmission. Conversely, when the work memory contains less IFP packets 12*g* than the predetermined amount, the work memory controller outputs the control signal 12*k* to the IFP packetizer 102*d* to request packet transmission.

Figure 4:
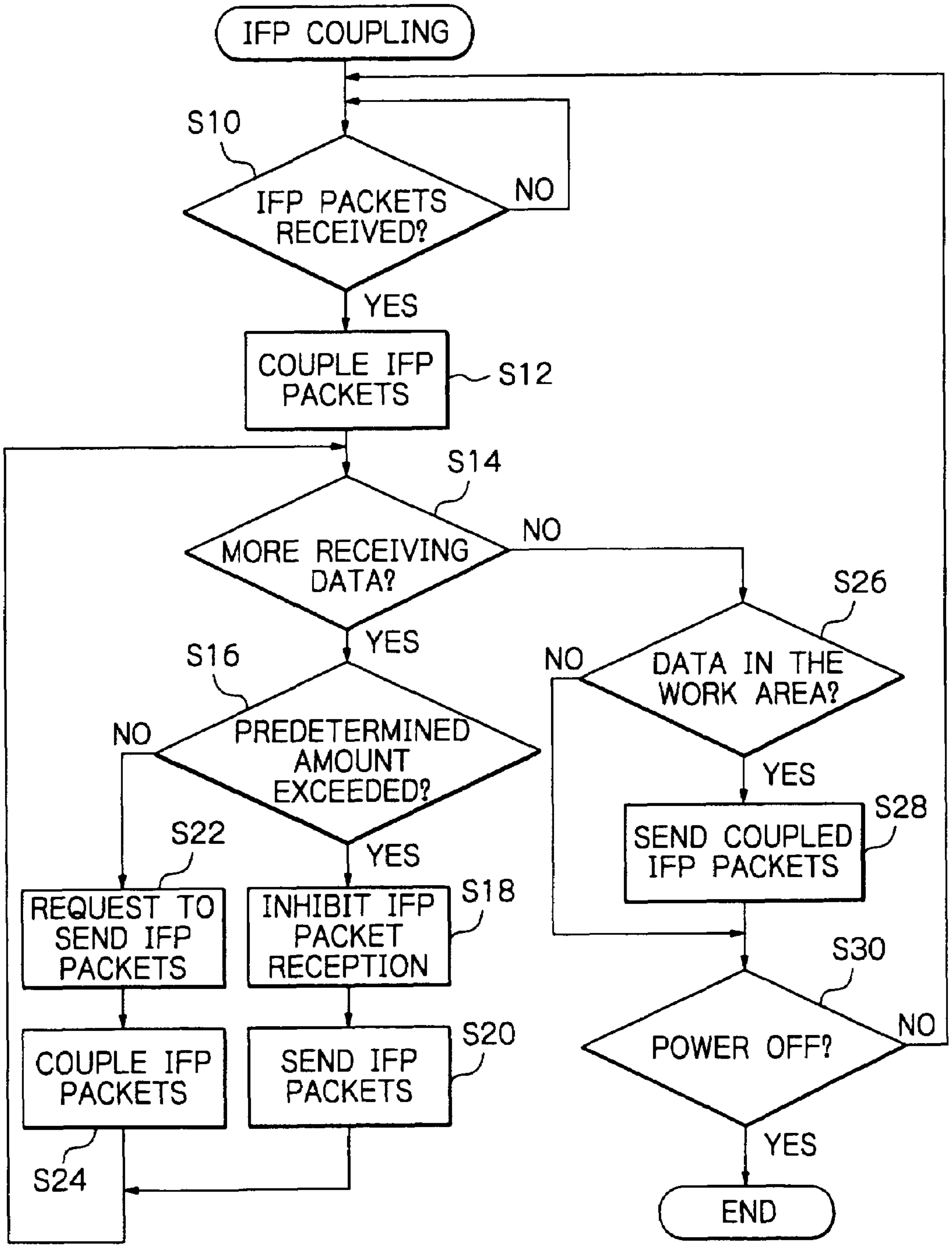
FIG. 4 is a flowchart useful for understanding the IFP coupling operation that is performed for IFP packets sent from the IFP packetizer shown in FIG. 3.

The operation of the IFP coupler 108*d* will be described briefly with reference to FIG. 4. The IFP coupler 108*d* checks if packets are supplied and the coupler 108*d* is in the receiving state. If no IFP packet is supplied (NO) at step S10, the coupler 108*d* waits for IFP packets to be supplied. When packets are supplied and the coupler 108*d* enters the receiving state (YES), the coupler 108*d* couples the received packets together in the work memory (step S12). The coupler 108*d* checks if there is more receiving data and more IFP packets are to be supplied (step S14). If there is more receiving data (YES), the coupler 108*d* checks if the IFP work memory includes data exceeding the predetermined amount (or area) (step S16).

If, as the result of checking, the storage area of the memory used for coupling IFP packets has exceeded the predetermined amount (YES), the coupler 108*d* inhibits the reception of IFP packets (step S18). To do so, the work memory controller outputs the control signal 12*k* as described above. IFP packets are sent to the TCP/IP transmitter 104*d* while the reception of IFP packets is inhibited (step S20). If the memory has not yet contained data exceeding the predetermined amount (NO), the coupler 108*d* requests the IFP packetizer 102*d* to send IFP packets (step S22). To do so, the work memory controller outputs the control signal 12*k* to the IFP packetizer 102*d*. The supplied IFP packets are coupled in the IFP coupler 108*d* (step S24). After steps S20 and S24, the control returns to step S14 to check if there is receiving data.

If, as the result of checking, there is no more receiving data (NO), the coupler 108*d* judges that there is no more data for generating IFP packets. The IFP coupler 108*d* then checks if there are IFP packets in the work memory (step S26). If there are coupled IFP packets or non-coupled IFP packets in the work memory area (YES), the IFP coupler 108*d* sends all remaining IFP packets to the TCP/IP transmitter 104*d* (step S28). If there is no data in the work memory (NO), the coupler 108*d* judges that all supplied FAX data has been converted to IFP packets and that those IFP packets have been transferred. After that, the coupler 108*d* checks if the power is turned off (step S30). If the power is turned off (YES), the coupler 108*d* terminates the sequence of processing. If the power is not turned off (NO), the coupler 108*d* returns control to step S10 and waits for IFP packets.

This configuration enables the FAX adapter 10 to sequentially couple and store IFP packets received from the IFP packetizer 102*d* and to send the coupled IFP packets to the TCP/IP transmitter 104*d*. This capability allows the TCP/IFP packet size to be increased when the delay of the IP network 30 is large and the TCP/IFP packets transfer efficiency is bad. Therefore, an abnormal termination, which would be caused when the transfer speed determined by the G3FAX protocol conforming to the Recommendation T.30 standard is not satisfied, may be avoided.

Figure 5:
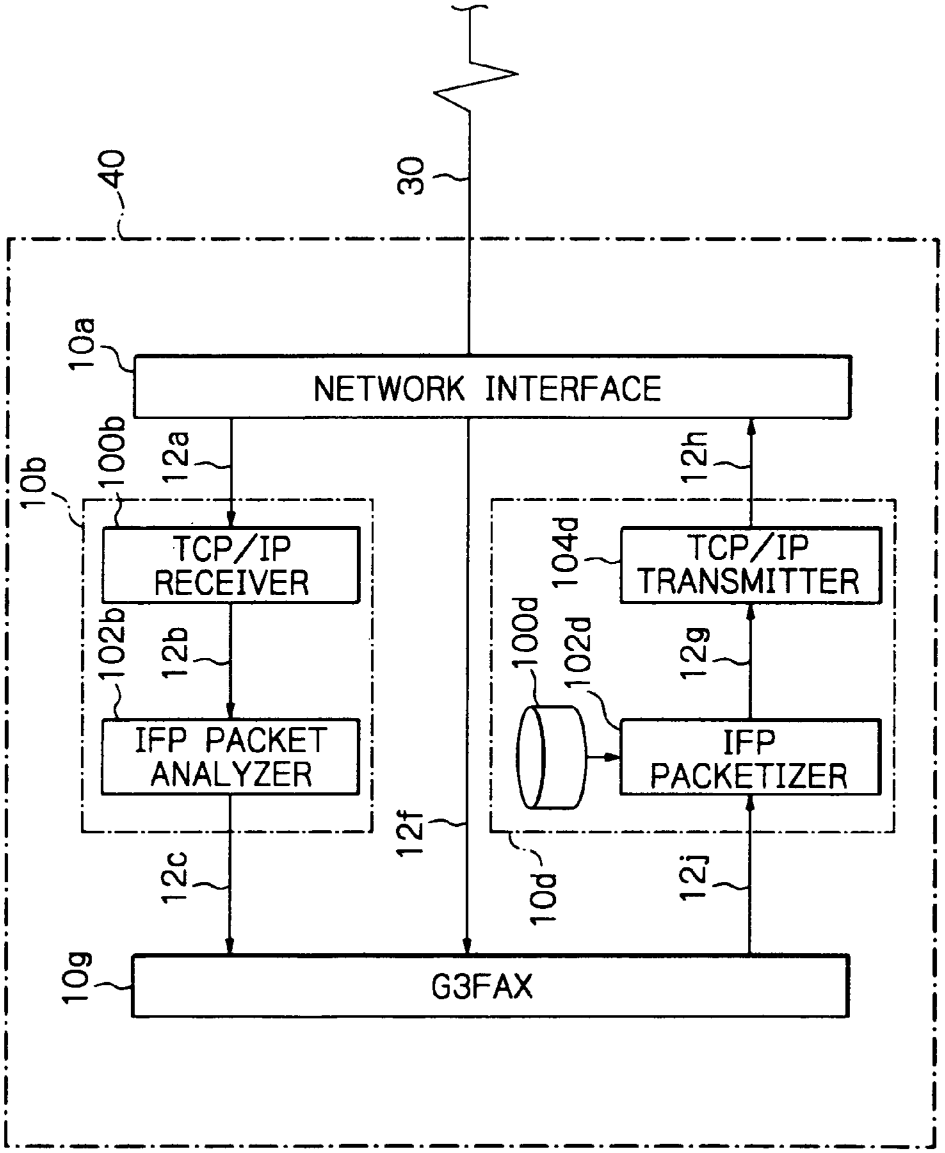
FIG. 5 is a block diagram schematically showing an embodiment of an integrated real-time FAX which includes the alternative embodiment shown in FIG. 2 and a built-in G3FAX.

The FAX adapter 10 has been described as an adapter to be connected to the G3FAX 20. It is also possible that the FAX adapter 10 is built into the G3FAX 20 to form a real-time FAX 40. As shown in FIG. 5, the real-time FAX 40 has a G3FAX 10 g in addition to the network interface 10*a*, receiver 10*b*, transmitter 10*d* which are the same components as those described above.

Figure 3:
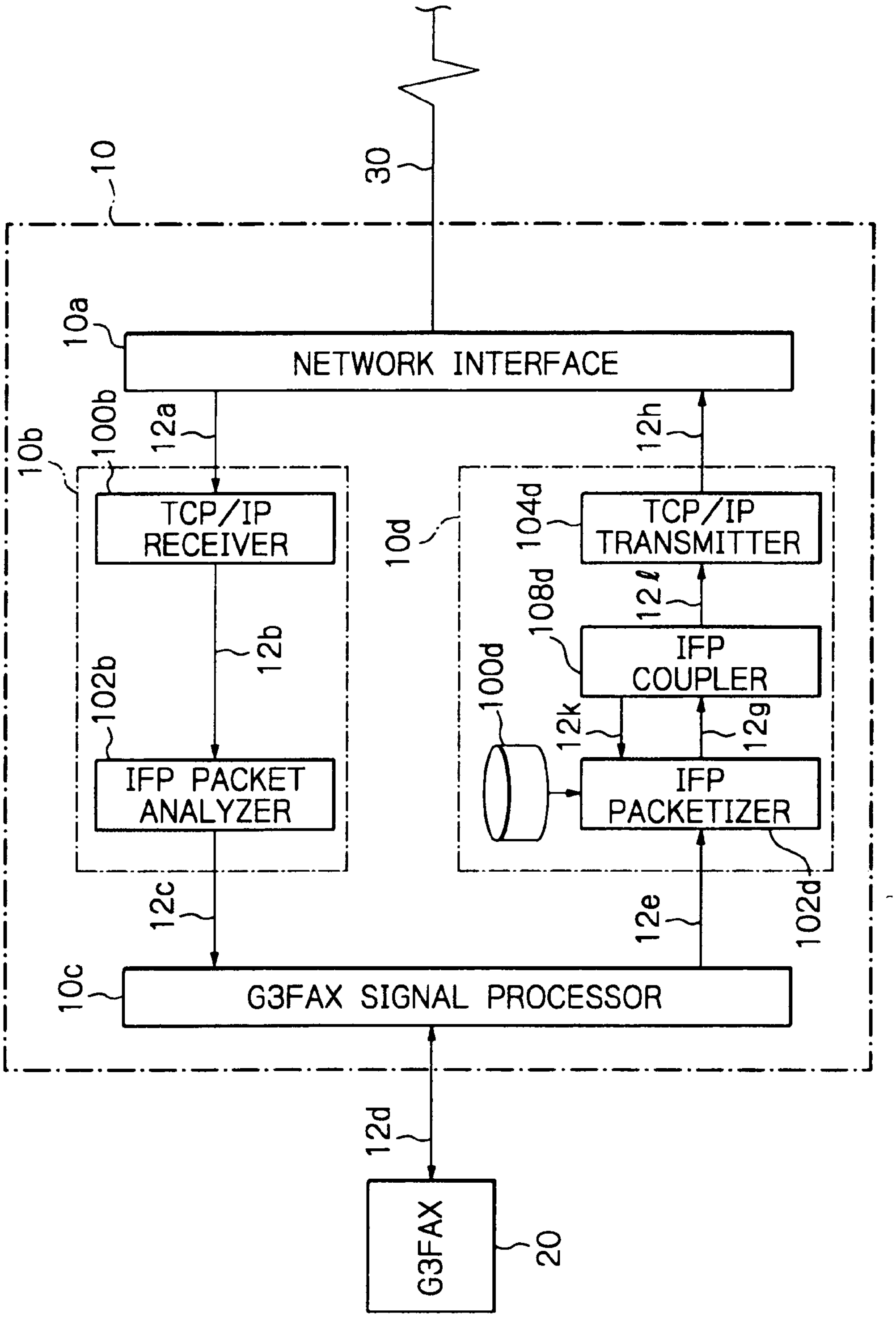
FIG. 3 is a schematic block diagram, also similar to FIG. 1, showing a further alternative embodiment of the invention.

The G3FAX 10 g comprises the transfer speed converter 10*f*, G3FAX signal processor 10*c*, and G3FAX 20 shown in FIG. 3. The delay information 12*f* is sent from the network interface 10*a* to the G3FAX 10*g*. This integrated real-time FAX 40 allows reliable facsimile communication to be performed in real time while still avoiding an abnormal termination such as the one described above.

Even if the G3FAX protocol requirements are not satisfied because of a delay and so on during communication with the other end equipment of connection via the FAX adapter 10 connecting the G3FAX 20 and the IP network 30, the above configuration resolves a discrepancy between the actual speed and the setting to prevent an abnormal termination that would occur in the conventional facsimile. The discrepancy is resolved by adaptively changing the packet size according to the delay information, by adaptively changing the transfer speed according to the information from the IP network, or by coupling packets. Therefore, the present invention enables a real time FAX to transmit data more reliably.

The entire disclosure of Japanese patent application No. 351713/1999 filed on Dec. 10, 1999 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A network interface apparatus for connecting a communication terminal to an IP (Internet Protocol) network, comprising:

an input circuit for receiving data to be transferred from the communication terminal;

a transmitter for transferring a packet to the IP network;

an interface circuit for interfacing said transmitter with the IP network, and for determining a delay in transmission between the IP network and said apparatus to produce delay information;

a packetizer circuit for packetizing the received data into the packet in accordance with an Internet Facsimile Protocol (IFP);

said transmitter determining which model for facsimile transmission the received data corresponds to, and allotting a header associated with the determined model to the packet; and a control circuit operative in response to the delay information for controlling said packetizer circuit to adjust a size of the packet on a basis of the delay information.

2. An apparatus in accordance with claim 1, wherein said control circuit comprises a memory circuit for storing therein packet size data representative of packet sizes, and for developing packet size data associated with the delay information, said packetizer circuit adjusting the size of the packet in response to the packet size data developed from said memory circuit.

3. An apparatus in accordance with claim 1, further comprising:

a receiver for receiving a packet transmitted over the IP network; and an output circuit for depacketizing the packet into data and outputting the data to the communication terminal.

4. A network interface apparatus for connecting a communication terminal to an IP (Internet Protocol) network, comprising:

an input circuit for receiving data to be transferred from the communication terminal;

a transmitter for transferring the data to the IP network;

an interface circuit for interfacing said transmitter with the IP network, and for determining a delay in transmission between the IP network and said apparatus to produce delay information;

a packetizer circuit for packetizing the received data into a packet in accordance with an Internet Facsimile Protocol (IFP);

said transmitter determining which model for facsimile transmission the received data corresponds to, and allotting a header associated with the determined model to the packet; and a control circuit interconnected between said input circuit and said transmitter and operative in response to the delay information for controlling said transmitter to adjust a transfer rate of transferring the packet on a basis of the delay information.

5. An apparatus in accordance with claim 4, further comprising:

a receiver for receiving a packet transmitted over the IP network; and an output circuit for depacketizing the packet into data and outputting the data to the communication terminal;

said control circuit being interconnected between said input circuit and said transmitted and controlling said input circuit to adjust a transfer rate of outputting the data on the basis of the delay information.

6. A network interface apparatus for connecting a communication terminal to an IP (Internet Protocol) network, comprising:

an input circuit for receiving data to be transferred from the communication terminal;

a transmitter for transferring a packet to the IP network;

an interface circuit for interfacing said transmitter with the IP network;

a packetizer circuit for packetizing the data to be transferred into a packet to develop the packet;

a packet coupler for coupling two or more of the packets with each other; and said packet coupler inhibiting said packetizer circuit from developing the packet when said packet coupler includes more packets than a first predetermined amount.

7. An apparatus in accordance with claim 6, further comprising a control circuit for controlling said packet coupler to couple more packets when said packetizer circuit includes more data to be packetized.

8. An apparatus in accordance with claim 6, wherein said interface circuit determines a delay in transmission between the IP network and said apparatus to produce delay information;

said apparatus further comprising a control circuit operative in response to the delay information for controlling said packetizer circuit to adjust a size of the packet on a basis of the delay information.

9. An apparatus in accordance with claim 8, further comprising:

a receiver for receiving a packet transmitted over the IP network; and an output circuit for depacketizing the packet into data and outputting the data to the communication terminal; and said control circuit controlling said output circuit to adjust a transfer rate of outputting the data on the basis of the delay information.

10. An apparatus in accordance with claim 6, wherein said packet coupler comprises:

a memory circuit for storing the coupled packets therein; and a memory control circuit operative in response to said packetizing circuit and said memory circuit for controlling writing and reading of said memory circuit on a basis of whether or not said packetizer circuit includes more data to be packetized than the first predetermined amount and of whether or not said memory circuit includes more packets than a second predetermined amount.

11. A method of interfacing a communication terminal with an IP (Internet Protocol) network, comprising the steps of:

receiving data to be transferred from the communication terminal;

determining a delay in transmission over the IP network;

packetizing the received data into a packet in accordance with an Internet Facsimile Protocol (IFP);

adjusting a size of the packet on a basis of the delay determined; and determining, when the received data are facsimile data, which model the received data corresponds to of, allotting a header associated with the determined model to the packet, and transferring the packet having the size adjusted to the IP network.

12. A storage medium for storing therein a procedure of interfacing a communication terminal with an IP (Internet Protocol) network, comprising the steps of:

receiving data to be transferred from the communication terminal;

determining a delay in transmission over the IP network;

packetizing the received data into a packet in accordance with an Internet Facsimile Protocol (IFP);

adjusting a size of the packet on a basis of the delay determined; and determining, when the received data are facsimile data, which model the received data corresponds to, allotting a header associated with the determined model to the packet, and transferring the packet having the size adjusted to the IP network.

13. A communication apparatus for connecting a communication terminal to an Internet Protocol (IP) network, comprising:

an input circuit for receiving data to be transferred from the communication terminal;

a transmitter for transferring a packet to the IP network;

an interface circuit for interfacing said transmitter with the IP network;

a packetizer circuit for packetizing the data to be transferred into a packet to develop the packet; and a packet coupler for coupler for coupling two or more of the packets with each other, said packet coupler inhibiting said packetizer circuit from developing the packet when said packet coupler includes more packets than a first predetermined amount.

14. An apparatus in accordance with claim 13, further comprising a control circuit for controlling said packet coupler to couple more packets when said packetizer circuit includes more data to be packetized.

15. An apparatus in accordance with claim 13, wherein said interface circuit determines a delay in transmission between the IP network and said apparatus to produce delay information;

said apparatus further comprising a control circuit operative in response to the delay information for controlling said packetizer circuit to adjust a size of the packet on a basis of the delay information.

16. An apparatus in accordance with claim 15, further comprising:

a receiver for receiving a packet transmitted over the IP network; and an output circuit for depacketizing the packet into data and outputting the data to the communication terminal;

said control circuit controlling said output circuit to adjust a transfer rate of outputting the data on the basis of the delay information.

17. An apparatus in accordance with claim 13, wherein said packet coupler comprises:

a memory circuit for storing the coupled packets therein; and a memory control circuit operative in response to said packetizing circuit and said memory circuit for controlling writing and reading of said memory circuit on a basis of whether or not said packetizer circuit includes more data to be packetized than the first predetermined amount and of whether or not said memory circuit includes more packets than a second predetermined amount.

* * * * *